United States Patent
Soffer et al.

(10) Patent No.: US 6,233,429 B1
(45) Date of Patent: May 15, 2001

(54) VSAT SATELLITE TELECOMMUNICATIONS SYSTEM

(75) Inventors: Yaron Soffer, Nes Ziona; Osher Frimerman, Tel Aviv, both of (IL)

(73) Assignee: Gilat Satellite Networks Ltd., Petach Tikva (IL)

( * ) Notice: Subject to any disclaimer, the term of this patent is extended or adjusted under 35 U.S.C. 154(b) by 0 days.

(21) Appl. No.: 09/185,071

(22) Filed: Nov. 3, 1998

(51) Int. Cl.[7] .............................. H04B 7/185; H04Q 7/20
(52) U.S. Cl. ...................... 455/12.1; 455/427; 455/428
(58) Field of Search .......................... 455/7, 13.1, 12.1, 455/426, 427, 428, 430; 342/352

(56) References Cited

U.S. PATENT DOCUMENTS

| | | | |
|---|---|---|---|
| 5,511,079 | * | 4/1996 | Dillon ................................. 371/43 |
| 5,555,242 | * | 9/1996 | Saitou ................................. 370/17 |
| 5,657,327 | * | 8/1997 | Hamada et al. ...................... 370/389 |
| 5,678,172 | * | 10/1997 | Dinkins .............................. 455/5.1 |
| 5,798,731 | * | 8/1998 | Lesthievent ......................... 342/357 |
| 6,052,554 | * | 4/2000 | Hendricks et al. ................... 455/5.1 |
| 6,060,996 | * | 5/2000 | Kaiser et al. ...................... 340/825.44 |

FOREIGN PATENT DOCUMENTS

2310976 * 10/1997 (GB) ............................ H04B/7/005

OTHER PUBLICATIONS

Hughes et al, "A microterminal satellite data communication system", Elecronics & Communication Engineering Journal, vol. 3, Issue 6, pp. 243–251, Dec. 1991.*

* cited by examiner

*Primary Examiner*—Dwayne Bost
*Assistant Examiner*—Raymond B. Persino
(74) *Attorney, Agent, or Firm*—Mark M. Friedman

(57) ABSTRACT

A VSAT telecommunications system including a satellite, first and second VSAT terminals, and a hub communicating via the satellite with the first and second VSAT terminals, the transmissions from the hub are generally continuous, while transmissions from the VSAT terminals are generally in bursts, and the at least one first VSAT terminal has the capability of receiving transmissions from the hub but lacks the capability of receiving transmissions from another VSAT terminal, and the at least one second VSAT terminal has the capability of receiving transmissions from the hub and also has the capability of receiving transmissions from another VSAT terminal.

6 Claims, 3 Drawing Sheets

VSAT SATELLITE TELECOMMUNICATIONS SYSTEM

FIELD OF THE INVENTION

The present invention relates to telecommunication in general, and in particular to improved VSAT satellite telecommunications methods and apparatus.

BACKGROUND OF THE INVENTION

Primary design considerations for a VSAT geostationary satellite telecommunication network include the cost of the remote terminal (VSAT) as a function of its complexity, the bandwidth efficiency as determined by the access scheme, and the communications delay as a function of the distance to the satellite. VSAT networks typically have two basic network configurations, the "star" configuration and the "mesh" configuration, with each configuration having important implications regarding cost, efficiency, and delay.

In a star network each inbound message from a VSAT is transmitted via satellite to a hub station, being the center of the star network, which then directs the message to its destination, usually to an external terminal, the hub station itself, or another VSAT. In a star network, when one VSAT sends a message to another VSAT the message is transmitted twice via satellite, and is referred to as having traveled two "hops," one from the source VSAT to the satellite and then to the hub (first hop), and another from the hub back to the satellite and then to the destination VSAT (second hop). With each hop an additional delay is added to the communication. A long delay is particularly undesirable in voice telecommunication where a delay is most noticeable between two VSATs The VSAT in a star network is relatively inexpensive, mainly because the hub station has a large satellite dish and powerful amplifiers that allow for simple and inexpensive RF VSAT components such as small antennas, commercial LNBs, and simple transmitter devices. Synchronization of VSATs is relatively simple as all VSATs listen to the hub station's outbound carrier, therefore timing "ticks" on the outbound transmission or any other similar method may be used.

In a mesh network any VSAT can communicate directly with any other VSAT in the network directly through a satellite without the need for an intermediate hub to relay messages between the VSATs, thus the delay is only one hop. In a mesh network the hub station is generally used to manage satellite resources such as allocating frequencies and performing Monitor & Control functions.

The VSAT in a mesh network is generally more expensive than the VSAT in a star network because of the former's ability to communicate with other VSATs and because there is no large antenna with which the VSAT communicates, such as the hub has in a star network. VSATs in a mesh network, therefore, generally require larger antennas and more powerful and stable RF front ends (i.e., LNBs, SSPAs, etc.) due to the symmetrical nature of the network and the link budget. Synchronization of VSATs is relatively complicated since each VSAT needs to acquire a time base from hub burst transmissions, which might be sparse and bursty, thus adding to the complexity and cost of a VSAT.

The hub-to-VSAT portion in a star network is usually more efficient than the same link in a mesh network as this link in a star network is continuous and may support multiple simultaneous communications efficiently by employing silence removal algorithms.

Some VSAT satellite telecommunications networks provide one or more links to a terrestrial network, such as a public switched telephone network (PSTN). In a star network this connection is usually located at the hub, and in a mesh network it can be at any VSAT as well. Multiple links to the PSTN at different locations would reduce the cost and delay of calls being made from the satellite network to the terrestrial one and vice-versa.

SUMMARY OF THE INVENTION

The present invention seeks to provide improved VSAT satellite telecommunications methods and apparatus that combine the benefits of star and mesh VSAT networks such that the average number of hops in VSAT-to-VSAT communication is reduced while keeping the VSATs relatively inexpensive.

There is thus provided in accordance with a preferred embodiment of the present invention a VSAT telecommunications system including a satellite, first and second VSAT terminals, and a hub communicating via the satellite with the first and second VSAT terminals, the transmissions from the hub are generally continuous, while transmissions from the VSAT terminals are generally in bursts, and the at least one first VSAT terminal has the capability of receiving transmissions from the hub but lacks the capability of receiving transmissions from another VSAT terminal, and the at least one second VSAT terminal has the capability of receiving transmissions from the hub and also has the capability of receiving transmissions from another VSAT terminal.

There is also provided in accordance with a preferred embodiment of the present invention an asymmetric VSAT telecommunications system for use with a satellite and a hub, the system including at least one first VSAT terminal, and at least one second VSAT terminal, the first VSAT terminal being operative to receive from the second VSAT terminal only via the hub, and the second VSAT terminal being operative to receive from the first VSAT terminal via the satellite and without passing through the hub.

There is additionally provided in accordance with a preferred embodiment of the present invention an asymmetric VSAT telecommunications system for use with a satellite and a hub, the system including at least first and second VSAT terminals and being characterized in that the transmission path from the first to the second VSAT terminals is shorter than the transmission path from the second to the first VSAT terminals.

Further in accordance with a preferred embodiment of the present invention the transmission path from the first to the second VSAT terminal does not pass through the hub, while the transmission path from the second to the first VSAT terminal does pass through the hub.

There is also provided in accordance with a preferred embodiment of the present invention a VSAT telecommunications system including a satellite, a hub, and a plurality of VSAT terminals, the transmissions from the hub are generally continuous, while transmissions from the VSAT terminals are generally in bursts, and each of the plurality of VSAT terminals communicate with the hub in a star configuration for management functions and communicate with others of the plurality of VSAT terminals in a mesh configuration for non-management functions.

There is additionally provided in accordance with a preferred embodiment of the present invention a VSAT telecommunications method for use with a satellite, a hub and at least first and second VSAT terminals which communicate with each other, the method including the steps of causing the at least first VSAT terminal to receive communications only via the hub, and causing the at least second VSAT terminal to receive communications not only via the hub.

There is also provided in accordance with a preferred embodiment of the present invention an asymmetric VSAT telecommunications method for use with a satellite and a hub, the method including operating a first VSAT terminal to receive from a second VSAT terminal only via the hub, and operating the second VSAT terminal to receive from the first VSAT terminal via the satellite and without passing through the hub.

There is additionally provided in accordance with a preferred embodiment of the present invention an asymmetric VSAT telecommunications method for use with a satellite and a hub, the method including operating at least one first and at least one second VSAT terminals for two way communications therebetween characterized in that the transmission path from the first VSAT terminal to the second VSAT terminal is shorter than the transmission path from the second VSAT terminal to the first VSAT terminal.

Further in accordance with a preferred embodiment of the present invention the transmission path from the first VSAT terminal to the second VSAT terminal does not pass through the hub, while the transmission path from the second VSAT terminal to the first VSAT terminal does pass through the hub.

There is also provided in accordance with a preferred embodiment of the present invention a VSAT telecommunications method employing a satellite, a hub and a plurality of VSAT terminals, the transmissions from the hub are generally continuous, while transmissions from the VSAT terminals are generally in bursts, the method being characterized in that each of the plurality of VSAT terminals communicates with the hub in a star configuration for management functions and communicates with others of the plurality of VSAT terminals in a mesh configuration for non-management functions.

BRIEF DESCRIPTION OF THE DRAWINGS

The present invention will be understood and appreciated from the following detailed description, taken in conjunction with the drawings in which.

DETAILED DESCRIPTION OF PREFERRED EMBODIMENTS

Figure 1:
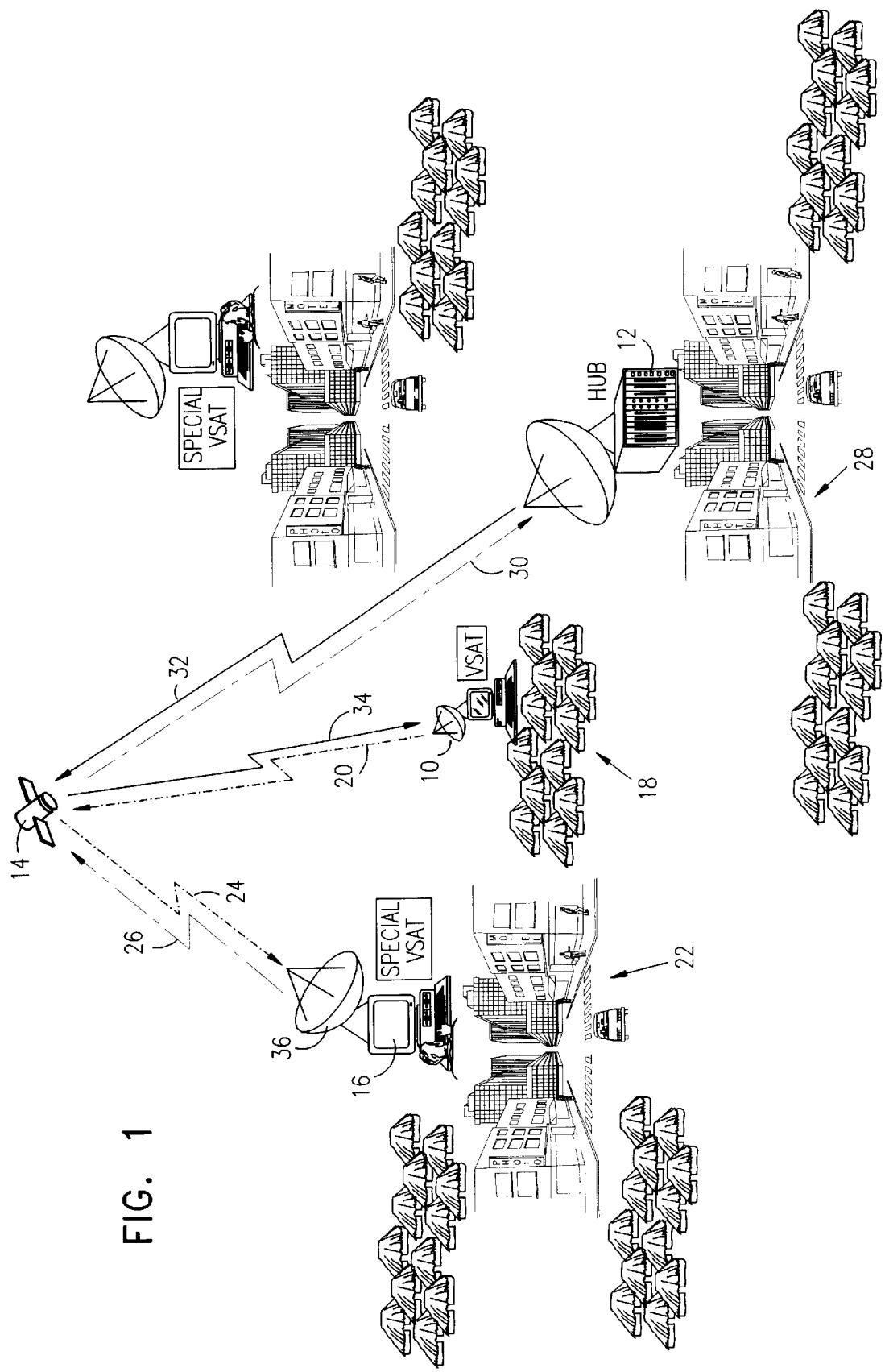
FIG. 1 is a simplified pictorial illustration of a VSAT satellite telecommunications system constructed and operative in accordance with a preferred embodiment of the present invention.
Figure 3:
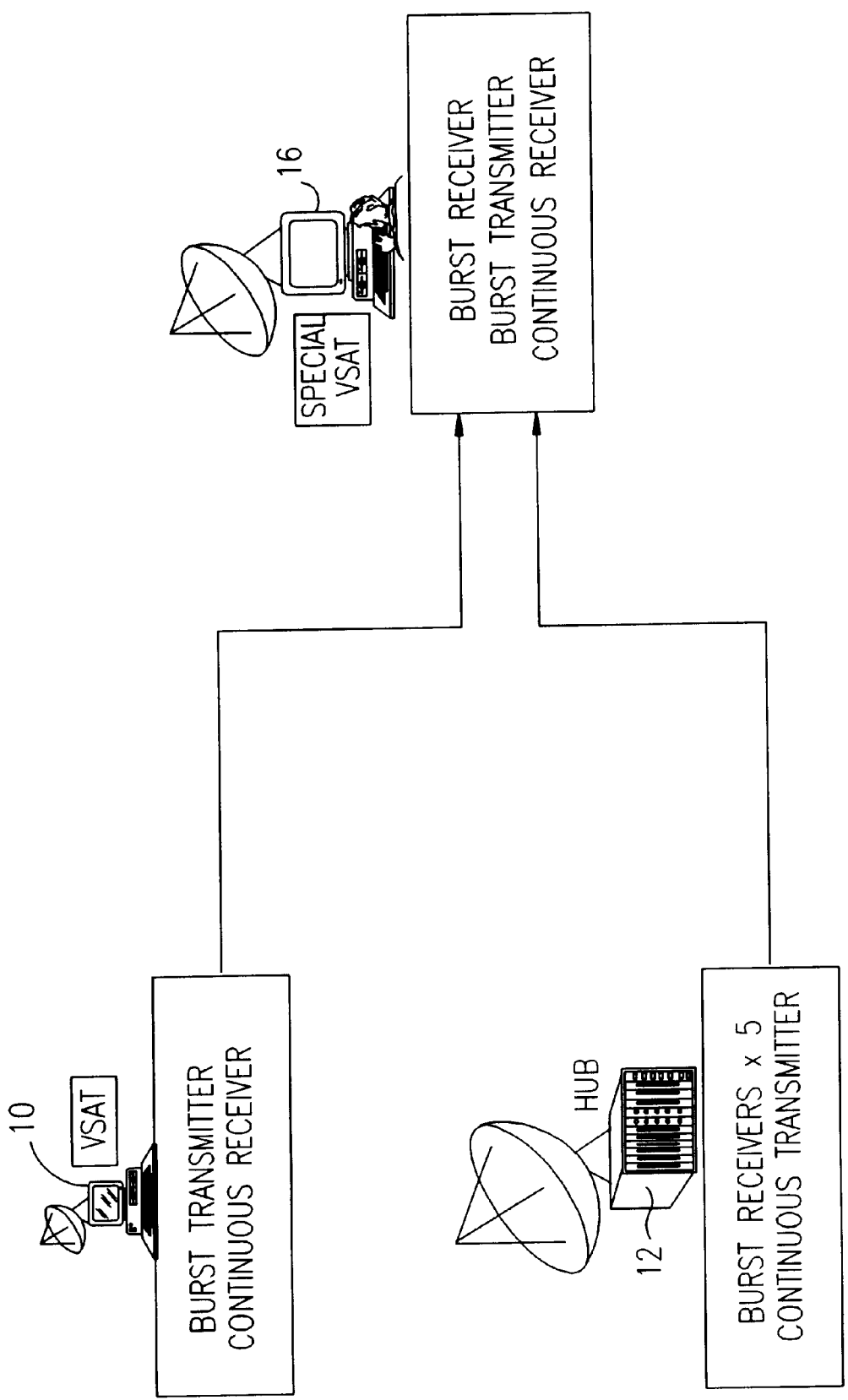
FIG. 3 is a simplified block diagram of elements of the system of FIG. 1.

Reference is now made to FIG. 1 which is a simplified pictorial illustration of a VSAT satellite telecommunications system constructed and operative in accordance with a preferred embodiment of the present invention, and FIG. 3 which is a simplified block diagram of elements of the system of FIG. 1. In the system of FIG. 1 one or more VSATs 10 are provided in communication with a hub 12 via a satellite 14. One of more specially-configured VSATs 16 are also provided in communication with hub 12. VSAT 10 is typically configured as any VSAT known in the art for use in a star network, having a burst transmitter and a continuous receiver that receives outbound transmissions from hub 12 which may include data, voice, synchronization information, M&C information, etc. VSAT 16 is preferably additionally configured to include a burst receiver such as is known in the art for use in a mesh network that enables them to receive messages from other VSATs. VSAT 16 typically has a dish 36 that is larger than a typical VSAT dish but smaller than a typical hub dish. Hub 12 is typically configured with a continuous transmitter and one or more burst receivers, such as 5.

Typical operation of the system of FIG. 1 is now described. VSAT 10, such as may be situated in a remote village 18, transmits a message destined for VSAT 16 in burst mode to satellite 14, the transmission path indicated by an arrow 20. VSAT 16, such as may be situated in a city 22, receives the transmission from satellite 14 in burst reception mode via the transmission path indicated by an arrow 24. VSAT 16 then transmits a return message destined for VSAT 10 to satellite 14 via the transmission path indicated by an arrow 26. Hub 12, such as may be situated in a city 28, receives the transmission from satellite 14 in burst reception mode via the transmission path indicated by an arrow 30. Hub 12 then transmits the message destined to satellite 14 via the transmission path indicated by an arrow 32. VSAT 10 then receives the transmission from satellite 14 in continuous reception mode via the transmission path indicated by an arrow 34. In this manner transmissions from VSAT 10 to VSAT 16 travel one hop along transmission paths 20 and 24, and transmissions from VSAT 16 to VSAT 10 travel two hops along transmission paths 26, 20, 32, and 34. Considering a round trip asymmetric transmission between VSATs 10 and 16 of three hops, the average delay will be 1.5 hops per direction rather than two hops as in a typical star network.

Figure 2:
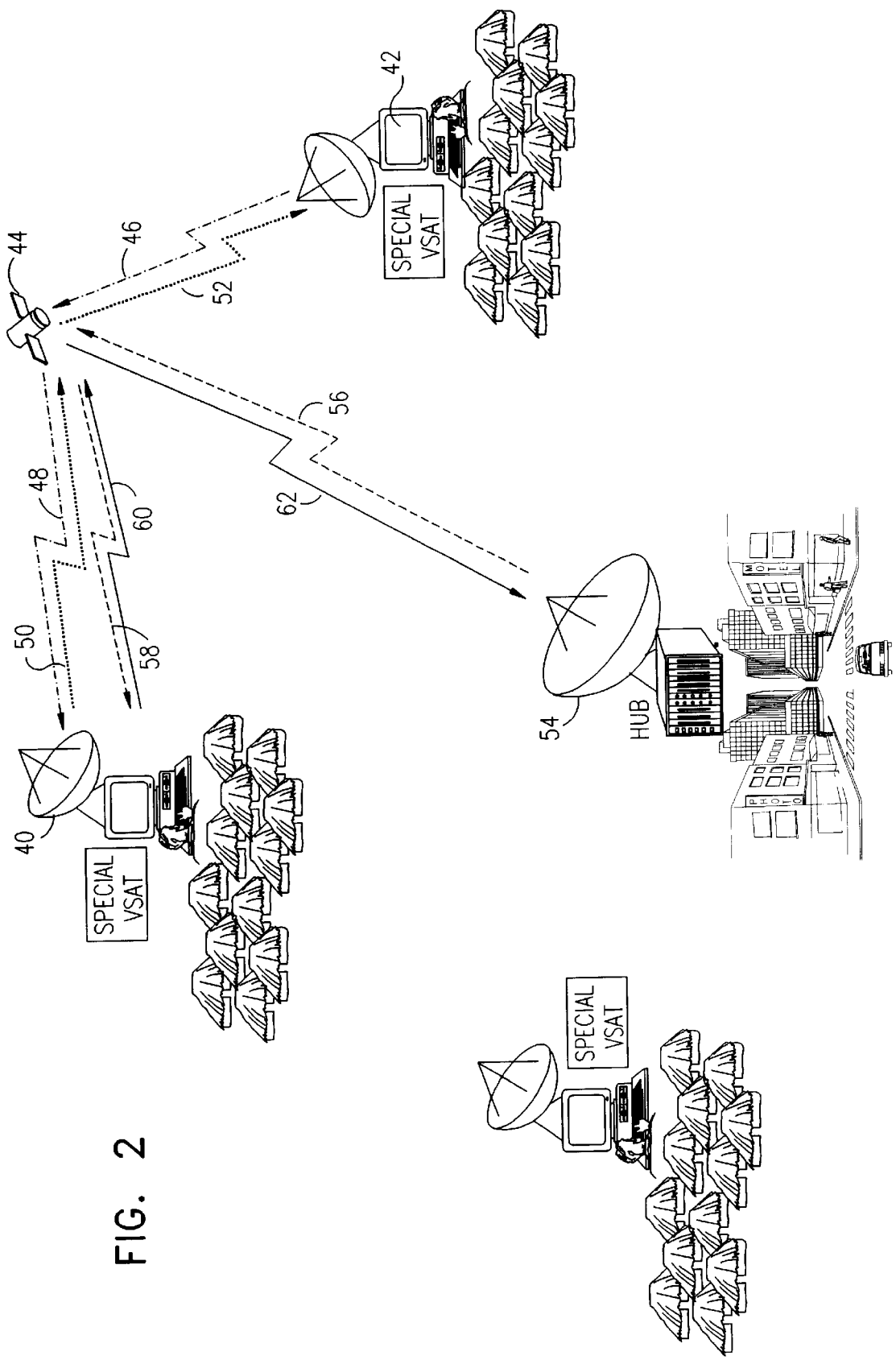
FIG. 2 is a simplified pictorial illustration of a VSAT satellite telecommunications system constructed and operative in accordance with another preferred embodiment of the present invention.

Reference is now made to FIG. 2 which is a simplified pictorial illustration of a VSAT satellite telecommunications system constructed and operative in accordance with another preferred embodiment of the present invention. In the system of FIG. 2 two specially-configured VSATs 40 and 42 are shown in communication with each other via a satellite 44, such as in a mesh network configuration along transmission paths indicated by arrows 46–52. VSATs 40 and 42 are preferably configured in the same manner as VSAT 16 (FIG. 1). VSATs 40 and 42 are also in preferably in communication with a hub 54, such as is particularly shown between VSAT 40 and hub 54 along transmission paths indicated by arrows 56–62. Hub 54 is preferably configured in the same manner as hub 12 (FIG. 1). Hub 54 preferably performs hub-to-VSAT management functions such as is known with respect to a star network configuration. In this manner VSATs 40 and 42 and hub 54 may operate collectively in a hybrid star/mesh network configuration.

It is appreciated that in both the systems of FIGS. 1 and 2 the specially-configured VSATs may act as gateways to regional PSTNs. It is also appreciated that two specially-configured VSATs might have normal mesh-type communications where one's transmission is directly received by the other's burst receiver via satellite, with a hub providing management capabilities, thus providing a "hub-dependent" mesh capability without the complexity of a stand alone mesh system.

It will be appreciated by persons skilled in the art that the present invention is not limited by what has been particularly shown and described hereinabove. Rather the scope of the present invention includes both combinations and sub-combinations of the features described hereinabove as well as modifications and variations thereof which would occur to a person of skill in the art upon reading the foregoing description and which are not in the prior art.

What is claimed is:

1. A VSAT telecommunications system comprising:

a satellite;

first and second VSAT terminals each communicating only via said satellite;

a hub communicating via said satellite with said first and second VSAT terminals, wherein transmissions from said hub are generally continuous, while transmissions from said VSAT terminals are generally in bursts, and wherein:

said at least one first VSAT terminal has the capability of receiving transmissions from said hub but lacks the capability of receiving transmissions from another VSAT terminal; and said at least one second VSAT terminal has the capability of receiving transmissions from said hub and also has the capability of receiving transmissions from another VSAT terminal.

2. An asymmetric VSAT telecommunications system for use with a satellite and a hub that communicates only via said satellite, the system comprising:

at least one first VSAT terminal communicating only via said satellite; and at least one second VSAT terminal communicating only via said satellite, said first VSAT terminal being operative to receive from said second VSAT terminal only via said hub; and said second VSAT terminal being operative to receive from said first VSAT terminal via said satellite and without passing through said hub.

3. An asymmetric VSAT telecommunications system for use with a satellite and a hub that communicates only via said satellite, the system comprising at least first and second VSAT terminals that each communicate only via said satellite and being characterized in that the transmission path from said first to said second VSAT terminals never passes through said hub, and so always is shorter than the transmission path from said second to said first VSAT terminals, which always passes through said hub.

4. A VSAT telecommunications method for use with a satellite, a hub and at least first and second VSAT terminals which communicate with each other, wherein the hub and each VSAT terminal communicates only via said satellite, the method comprising the steps of:

causing the at least first VSAT terminal to receive communications only via said hub; and causing the at least second VSAT terminal to receive communications not only via said hub.

5. An asymmetric VSAT telecommunications method for use with a satellite and a hub that communicates only via said satellite, the method comprising:

operating a first VSAT terminal, that communicates only via said satellite, to receive from a second VSAT terminal only via said hub; and operating said second VSAT terminal, that communicates only via said satellite, to receive from said first VSAT terminal via said satellite and without passing through said hub.

6. An asymmetric VSAT telecommunications method for use with a satellite and a hub that communicates only via said satellite, the method comprising operating at least one first and at least one second VSAT terminals, that each communicate only via said satellite, for two way communications therebetween characterized in that the transmission path from said first VSAT terminal to said second VSAT terminal never passes through said hub, and so always is shorter than the transmission path from said second VSAT terminal to said first VSAT terminal, which always passes through said hub.

* * * * *